United States Patent [19]
Watson

[11] 3,920,757
[45] Nov. 18, 1975

[54] CHLORINATION WITH SULFURYL CHLORIDE

[75] Inventor: William David Watson, Midland, Mich.

[73] Assignee: The Dow Chemical Company, Midland, Mich.

[22] Filed: Jan. 23, 1975

[21] Appl. No.: 543,389

Related U.S. Application Data

[63] Continuation of Ser. No. 174,914, Aug. 25, 1971, abandoned, which is a continuation-in-part of Ser. No. 13,751, Feb. 24, 1970, abandoned.

[52] U.S. Cl........ 260/623 H; 260/620; 260/612 R; 260/650 R; 260/619 R
[51] Int. Cl.² .................. C07C 39/28; C07C 39/30
[58] Field of Search............ 260/623 H, 620, 623 R, 260/650 R, 612 R, 619 R

[56] References Cited
UNITED STATES PATENTS
3,542,882   11/1970   Ashall et al..................... 260/623 H Primary Examiner—James O. Thomas, Jr.
Assistant Examiner—W. B. Lone
Attorney, Agent, or Firm—Ralph M. Mellom

[57] ABSTRACT

In the process for chlorinating an aromatic compound of the formula

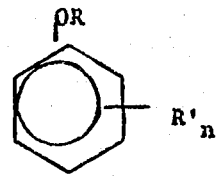

wherein R = H, phenyl, alkyl or carboxyalkyl, and
R'= alkyl, phenyl, alkylphenyl, phenalkyl or halo in the ortho or meta position
n = 0–2
with sulfuryl chloride, the rate of reaction is substantially increased and the selectivity for para chlorination is enhanced by conducting the reaction in the presence of certain metal salt-organic sulfur catalysts.

12 Claims, No Drawings

CHLORINATION WITH SULFURYL CHLORIDE

CROSS-REFERENCE TO RELATED APPLICATION

This is a continuation of my prior application Ser. No. 174,914 filed Aug. 25, 1971, now abandoned, which in turn is a continuation-in-part of my prior application Ser. No. 13,751 filed Feb. 24, 1970, now abandoned.

BACKGROUND OF THE INVENTION

The chlorination of aromatic compounds with sulfuryl chloride is known. For example, DuBois in Z. F. Chem. 705 (1866) reported that treatment of molten phenol with an equal molar amount of sulfuryl chloride yields only p-chlorophenol. Sulfuryl chloride was first reported as a chlorinating agent for o-cresol by Sah and Anderson in J. Am. Chem. Soc., 63, 3164 (1941). Their data showed that o-cresol reacted with sulfuryl chloride to yield 84% of the 4-chloro-o-cresol.

Sullivan in U.S. Pat. No. 2,777,002 and British Pat. No. 948,601 reported that phenols, especially those containing hydrogen or an ortho-para direction group in the ortho position, may be converted to the p-halophenol in yields as high as 95% at temperatures not exceeding 75°C. by the use of 1.1 moles of sulfuryl halide per mole of phenol in the presence of 0.5 to 2% of a Friedel-Crafts metallic halide catalyst. Haesler et al. in German Patent No. 1,203,275 further improved the work of Sullivan by finding that if the Friedel-Crafts catalysts was introduced into the reaction as a powdered metal rather than as the salt, the yield of the 4-chloro-o-cresol was increased. Throughout these reactions, the rate of chlorination has been low. For instance, Sullivan shows essentially complete reaction at temperatures of 10°–30°C. in no less than 8 hours.

The chlorination of benzene with sulfuryl chloride in the presence of a catalyst of $AlCl_3$ and sulfur chloride is described by Silberrad in J. Chem. Soc., 119, 2029 (1921) and British Patent No. 193,200 and the chlorination of trichloromethylbenzene with the same chlorinating agent is shown by Ballester et al. in J.A.C.S., 82, 4254 (1960). Such chlorinations do not show the selectivity of the present invention.

Bing et al. in Australian Patent No. 230,337 show chlorinations of benzene, halobenzenes, and toluene with chlorine in the presence of a catalyst of a metal or metal halide and an organic sulfur compound. This patent, however, does not teach the use of sulfuryl chloride nor does it suggest that the aromatic compounds of the present invention can be chlorinated selectively in the para position.

SUMMARY OF THE INVENTION

It has now been found according to the present invention that in the chlorination of an aromatic compound of the formula

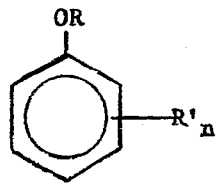

wherein R = H, phenyl, alkyl or carboxyalkyl, and

R' = alkyl, phenyl, alkylphenyl, phenalkyl or halo in the ortho or meta position n = 0–2 sulfuryl chloride, the rate of reaction is substantially increased and the selectively of the reaction toward para chlorination is enhanced by conducting the reaction in the presence of a small but effective amount of certain metal salt-organic sulfur catalysts.

The important and novel aspect of the present invention is the particular metal-organic sulfur catalysts which give a rapid reaction of improved selectivity toward para substitution in chlorinations with sulfuryl chloride. The other conditions of the reaction are not critical and are generally conducted in accordance with known techniques and conditions for chlorinating with sulfuryl chloride.

The catalysts of the invention are surprisingly different from those of the art because the addition of certain sulfur cocatalysts to the Friedel-Crafts type catalyst shown in the art gives an unexpected increase in para chlorination over the use of the Friedel-Crafts catalyst alone.

The catalyst of the invention consists essentially of two components: 10 certain metal halides or metal phenoxides; and 20 certain divalent sulfur compounds. Although the two components will be discussed individually, the catalysts used in the invention are any combination of one or more of the specific metal cocatalysts in combination with one or more of the specific organic sulfur cocatalysts.

The metal halide or metal phenate component of the catalyst may suitably be selected from the group consisting of halides or phenates of antimony, aluminum, iron, tin, titanium or zinc, with the cocatalysts derived from antimony, aluminum, iron and tin being preferred because of the high selectively. Catalysts derived from aluminum and iron are especially preferred because of their commercial availability and high selectively. The halides of these metals, especially the chlorides, are of greatest importance in the reaction.

The divalent sulfur compounds of the present invention are those selected from the groups consisting of thiophene, p-dithiane, diphenyl sulfide, thianthrene, dibenzyl sulfide, polyphenylene sulfide, diphenyl disulfide, thiophenol, dibenzothiophene, pentamethylene sulfide and carbon disulfide, Of these compounds thiophene, p-dithiane, diphenyl sulfide, thianthrene, dibenzyl sulfide, polyphenylene sulfide, diphenyl disulfide and thiophenol are preferred, with thiophene, p-dithiane, diphenyl sulfide and thianthrene being especially preferred because of the high selectivity and rapid reaction.

Any of these divalent sulfur cocatalysts, except of course for carbon disulfide, may contain substituents, such as an alkyl or alkoxy of up to 10 carbons or a halo, that do not materially derogate the effectiveness of the reaction. Preferred substituents on the sulfur cocatalysts are the hydrocarbon substituents of up to 6 carbons. Representative examples of suitable substituted sulfur cocatalysts include: trichlorothiophene, biphenyl phenyl sulfide, polythiophene, bromophenyl phenyl sulfide, methylthiophenol, di-(p-chlorobenzyl)sulfide, 2-ethylpentamethylene sulfide, bromo-p-dithiane, bromothianthrene, biphenyl diphenyl disulfide, chlorodibenzothiophene, methoxydiphenyl sulfide and similar compounds.

The amount of each component of the catalyst present in the reaction may be any amount which shows a favorable comparison in the reaction as compared to the use of sulfuryl chloride alone or to the use of sulfuryl chloride in the presence of FeCl₃ or AlCl₃. These amounts may vary widely as different catalyst components are employed.

As a general rule, the concentration of the metal cocatalyst may vary widely but in the preferred practice of the invention, their concentrations are normally greater than 0.1% by weight of the aromatic substrate. The concentration of the sulfur compound may range from about 0.02 to about 10% or more by weight of the aromatic compound, with about 0.05 to about 2% by weight of the divalent sulfur compound being preferred.

The aromatic compound chlorinated in the invention may suitably be any compound of the generic formula described above. These compounds are well known and are exemplified in the specific embodiments. phenol, diphenyl ether and alkylphenols wherein the alkyl group contains 1 to 6 carbon atoms are especially preferred, with the dichlorination of phenol and the monochlorination of o-cresol being of special interest.

The reaction conditions of temperature and pressure may vary widely ad different aromatic substrate are chlorinated. Preferably the reaction is conducted in the liquid phase at a temperature below 100°C., but in some cases higher temperatures are required to maintain the liquid phase. Although the rate of reaction is increased as the temperature is increased, the selectivity of the isomer distribution tends to decrease as higher temperatures are employed. As a consequence, temperatures of about 10° to about 60°C. are especially preferred when selectivity is important. Usually the reaction is conducted at atmospheric pressure, but at higher temperatures, pressure may be needed to maintain the liquid phase.

Solvents may be optionally employed. Suitable solvents include those described by Campbell and Shields in Tetrahedron 21 (2) 221 (1965), but conducting the reaction in the absence of a solvent is preferred.

SPECIFIC EMBODIMENTS

Examples 1-34 and Comparative Examples A-B — Chlorination with Sulfuryl Chloride in the Presence of Metal-Organic Sulfur Catalysts The reaction of 1 g. mole of o-cresol with 1 g. mole of sulfuryl chloride was conducted in parallel experiments to determine the effect of different cocatalysts on the rate and selectively of the chlorination. The o-cresol was placed in a reactor, maintained at the temperature noted in the Tables and sulfuryl chloride was continuously added at this temperature over the time shown in the Tables. After the addition, the reaction mixture was heated to remove the dissolved gas, and the product obtained was analyzed by vapor phase chromatography. In each example, the reaction was conducted in the presence of 1 g. of the organic sulfur catalyst and 1 g. of metal catalyst.

Table I shows comparative examples of o-cresol and sulfuryl chloride or chlorine in the presence or absence of catalysts which exemplify the art. Table II shows the reaction of o-cresol and sulfuryl chloride in the presence of the divalent sulfur catalysts of the invention with AlCl₃. Table III shows the reaction of o-cresol and sulfuryl chloride in the presence of various metal salt catalysts of the invention and diphenyl sulfide. Table IV shows the effect of substituents on diphenyl sulfide in the reaction of sulfuryl chloride with o-cresol. Table V shows the reaction of various substituted phenols. Table VI shows the chlorination of various ethers. In all the Tables, the product analysis heading 4Cl/6Cl is the amount of the monochloro product that is para substituted divided by the amount of the monochloro product which is ortho substituted.

TABLE I

Comparative Examples Reacting o-Cresol with Sulfuryl Chloride Exemplifying the Art

| Example | Catalyst | Time, Hr. | T, °C. | Product Analysis. Wt. % | | |
|---|---|---|---|---|---|---|
| | | | | o-cresol | 4Cl/6Cl | Dichloro |
| Comp. A | None | 2 | 15 | 10.25 | 5.54 | 1.28 |
| Comp. B | 1.0 g. AlCl₃ | 2 | 15 | 16.15 | 8.64 | 0.75 |
| Comp. C | 1.0 g. AlCl₃ 1.0 g. S₂Cl₂ | 2.67 | 15 | 3.11 | 5.46 | 2.11 |
| Comp. D | 1.0 g. AlCl₃ 1.0 g. SCl₂ | 2.5 | 15 | 6.48 | 5.57 | 1.41 |
| Comp. E* | 1.0 g. AlCl₃ 1.0 g. O₂S | 2 | 35 | 0.18 | 5.53 | 21.87 |

*Reaction conducted by bubbling Cl₂ through the reaction until o-cresol was essentially all reacted.

TABLE II

Reaction of o-Cresol with Sulfuryl Chloride in the Presence of 1.0 g. of Sulfur Catalysts and 1.0 g. of AlCl₃

| Example | Sulfur Catalyst | Time, Hr. | T, °C. | Product Analysis, Wt, % | | |
|---|---|---|---|---|---|---|
| | | | | o-cresol | 4Cl/6Cl | Di-chloro |
| 1 | Thiephene | 2 | 15 | 2.92 | 21.43 | 0.57 |
| 2 | p-Dithiane | 2 | 15 | 1.93 | 20.28 | 0.54 |
| 3* | Diphenyl sulfide | 2.5 | 15 | 0.03 | 18.91 | 4.65 |
| 4 | Thianthrene | 3 | 20 | 4.12 | 18.08 | 10.00 |
| 5 | Dibenzyl sulfide | 2.0 | 15 | 10.66 | 15.72 | 0.73 |
| 6* | Polyphenylene sulfide | 3.0 | 20 | 0.09 | 11.58 | 3.10 |
| 7 | Diphenyl disulfide | 3.0 | 18 | 3.13 | 11.67 | 0.26 |
| 8 | Thiophenol | 3.5 | 17 | 2.61 | 11.07 | 0.96 |

TABLE II-continued

Reaction of o-Cresol with Sulfuryl Chloride in the Presence of 1.0 g. of Sulfur Catalysts and 1.0 g. of AlCl₃

| Example | Sulfur Catalyst | Time, Hr. | T, °C. | Product Analysis, Wt. % | | |
|---|---|---|---|---|---|---|
| | | | | o-cresol | 4Cl/6Cl | Di-chloro |
| 9 | Dibenzo-thiophene | 2.0 | 15 | 8.76 | 9.81 | 1.30 |
| 10 | Pentamethylene sulfide | 2.0 | 15 | 5.27 | 9.87 | 0.88 |
| 11 | Carbon disulfide | 3.0 | 40 | 17.71 | 9.46 | 0.00 |

*1.05 Moles of sulfuryl chloride reacted.

TABLE III

Reaction of o-Cresol with Sulfuryl Chloride in the Presence of Diphenyl Sulfide-Metal Catalysts

| Ex. | Metal Catalyst | Time, Hr. | T, °C. | Product Analysis, Wt. % | | |
|---|---|---|---|---|---|---|
| | | | | o-cresol | 4Cl/6Cl | Di-chloro |
| 12 | SbCl₃ | 2.5 | 18 | 4.51 | 19.44 | 0.22 |
| 13* | AlCl₃ | 3.0 | 14 | 0.00 | 21.58 | 6.76 |
| 14 | Al(Oφ)₃ | 3.0 | 15 | 3.75 | 18.57 | 0.34 |
| 15 | FeCl₃ | 2.0 | 18 | 3.10 | 18.26 | 1.64 |
| 16 | FeBr₃ | 2.0 | 15 | 2.81 | 17.42 | 0.89 |
| 17 | SnCl₄ | 3.0 | 20 | 2.10 | 15.76 | 1.98 |
| 18 | TiCl₄ | 2.5 | 18 | 4.91 | 11.38 | 2.07 |
| 19 | ZnCl₂ | 3.0 | 15 | 4.23 | 10.82 | 1.31 |

*1.1 Moles of sulfuryl chloride reacted.

TABLE IV

Reaction of o-Cresol with Sulfuryl Chloride in the Presence of a Substituted Diphenyl Sulfide-AlCl₃ catalyst at 26.5°C.

| Example | Catalyst Sulfur | Time, Hr. | Product Analysis, Wt. % | | |
|---|---|---|---|---|---|
| | | | o-cresol | 4Cl/6Cl | Di-chloro |
| 20 | (p-CH₃φ)₂S | 5.3 | 5.07 | 18.88 | 2.04 |
| 21 | pCH₃φSφ | 5.5 | 10.65 | 18.31 | 10.95 |
| 22 | p-CH₃OφSφ | 4.5 | 12.79 | 16.19 | 0.53 |
| 23 | p-ClφSφ | 5.0 | 3.25 | 13.67 | 2.13 |
| 24 | (p-Clφ)₂S | 5.0 | 3.36 | 10.19 | 0.91 |

TABLE V

Chlorination of One Mole of Various Substituted Phenols with Sulfuryl Chloride in the Presence of 0.1 g. of FeCl₃ and 0.2 g. of Diphenyl Sulfide at 15°–20°C. for 2 Hours

| Example | Substituted Phenol | Product Analysis, Wt. % | | |
|---|---|---|---|---|
| | | unreacted | 4Cl/6Cl | Dichloro |
| 25 | m-Methyl | 2.3 | 7.5 | 3.1 |
| 26 | o-Ethyl | 0.5 | 16.23 | 1.5 |
| 27 | o-n-Propyl | 1.3 | 15.4 | 0.9 |
| 28 | o-iso-Propyl | 0.4 | 8.7 | 2.7 |
| 29 | o-sec-Butyl | 1.3 | 14.2 | 0.4 |
| 30 | o-t-Butyl | 0.3 | 3.4 | 3.0 |
| 31 | o-Cyclohexyl | 2.4 | 6.65 | 1.9 |

TABLE VI

Monochlorination of One Mole of Various Ethers with Sulfuryl Chloride in the Presence of 0.2 g. of FeCl₃ and 0.1 g. of Diphenyl Sulfide at 15°–20°C. for 2 Hours

| Example | Ether | Product Analysis, Wt. % | | |
|---|---|---|---|---|
| | | Unreacted | 4Cl/6Cl | Dichloro |
| 32 | Anisole | 2.6 | 8.1 | 0.3 |
| 33 | o-Methylanisole | 1.4 | 26.3 | 0 |
| 34 | Diphenyl ether | 13.0 | 10.1 | 11.7 |

Example 35 - Chlorination of Phenol with FeCl₃-Diphenyl Sulfide

In the same manner as shown above, 5 moles of phenol were reacted with 10.5 moles of sulfuryl chloride in the presence of 1 g. diphenyl sulfide and 1.5 g. of FeCl₃. The sulfuryl chloride was added continuously at a temperature of about 25°C. over 1.75 hours. After ¾ hour a sample showed the product distribution by weight percent was: 2.7% phenol, 8.5% 2-chlorophenol, 89.5% 4-chlorophenol, and 0.3% 2,4-dichlorophenol for a 4- to 2-isomer ratio of 10.5. After 1.75 hours at 25°C., the reaction mixture was heated at about 85°C. for 0.25 hours, and 819.9 g. of product was recovered which was analyzed to contain: 97.3% 2,4-dichlorophenol, 0.4% 2,6-dichlorophenol and 2.0% 2,4,6-trichlorophenol, for a 2,4- to 2,6-isomer ratio of above 200. In a comparative experiment using direct chlorination of phenol with chlorine in the presence of a Friedel-Crafts catalyst the 2,4- to 2,6-isomer ratio was 11.5. In the absence of a sulfur promoter, only 4% dichlorophenols were obtained with 2.1 moles of sulfuryl chloride in the presence of 2% FeCl₃ for 24 hours at 40°–45°C.

Example 36 - Chlorination of o-Chlorophenol

In the same manner as shown above, 1 mole of 2-chlorophenol was chlorinated with 1 mole of sulfuryl chloride in the presence of 0.2 g. of diphenyl sulfide and 0.3 g. of FeCl₃. The sulfuryl chloride was added over 2.5 hours at 35°C. and after heating at 85°C. for 1.0 hour, 163.2 g. of product was recovered which was analyzed to contain: 1.6% 2-chlorophenol, 94.0% 2,4-dichlorophenol, 4.2% 2,6-dichlorophenol and 0.2% 2,4,6-trichlorophenol, for a 2,4- to 2,6-isomer ratio of 22.4.

Example 37 - Chlorination of Diphenyl Ether

In a similar manner to the examples above, 0.2 mole of diphenyl ether was reacted with 0.4 mole of sulfuryl chloride in the presence of 1 g. of diphenyl sulfide and 1 g. of AlCl₃. The sulfuryl chloride was added to the diphenyl ether continuously over 45 minutes at a temperature of 22° to 30°C. The mixture was then maintained at 70°C. for 1 hour and 45 grams of product were recovered which were analyzed to contain: 3% monochlorodiphenyl ether, 19.8% 2,4'-dichlorodiphenyl ether and 77.2% 4,4'-dichlorodiphenyl ether, for a 4,4'- to 2,4'-isomer ratio of 3.9.

Example 38 - Chlorination of 3,5-Xylenol

In a manner similar to the examples above, a reactor was charged with 490 g. (4.0 moles) of 3,5-xylenol, 4.0 g. diphenyl sulfide, and 4.0 g. FeCl₃. To this reaction mixture was slowly added over 2.5 hours 540 g. (4.0 moles) of sulfuryl chloride. The final product was analyzed to contain 1.9 wt. % 3,5-xylenol, 2.4% of 2-chloro-3,5-xylenol and 89.9% of 4-chloro-3,5-xylenol.

Example 39 - Chlorination of o-Tolyloxyacetic Acid

In a manner similar to the examples above, 20.8 g. (0.125 mole) of o-tolyloxyacetic acid in 60 g. of glacial acetic acid, 5 drops of diphenyl sulfide and 0.1 g. of FeCl$_3$ were added to a reactor. To this reaction mixture was slowly added 16.9 g. (0.125 mole) of sulfuryl chloride over 1 hour and 20 minutes. The product obtained weighed 25.8 g. and had a melting point of 111°–113°C. The product was analyzed to contain by weight: 2.5% o-tolyloxyacetic acid; 90.8% 4-chloro-o-tolyloxyacetic acid; 5.8% 6-chloro-o-tolyloxyacetic acid and 0.2% 4,6-dichloro-o-tolyloxyacetic acid. The 4 chloro to 6 chloro ratio was 15.6.

In the same manner as described by the examples above, other catalysts, such as ZnCl$_2$-thiophene, titanium-p-dithiane, SnCl$_2$-diphenyl sulfide, ironthianthrene, aluminum-diphenyl disulfide, SbBr$_3$-polyphenylene sulfide, SbCl$_3$-carbon disulfide, AlBr$_3$-pentamethylene sulfide, Al(O)$_3$-dibenzothiophene, are used to catalyze the chlorination of o-cresol or phenol with sulfuryl chloride. Also, in the same manner, other aromatic substrates, such as o-phenylphenol, 3-(p-tolyl)phenol, o-benzylphenol, n-hexyl phenyl ether or 3-phenoxy propionic acid, are chlorinated with sulfuryl chloride in the presence of a metal-organic sulfur cocatalyst of the invention. In the reactions mentioned above, the ratio of p-chloro substitutions as compared to the o-substitution is unusually high.

I claim:

1. In the process for mono- or di chlorinating an aromatic compound in the para or the para and ortho position of the formula

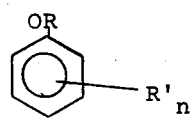

wherein R = H, phenyl, alkyl or carboxyalkyl, and
R' = alkyl, phenyl, alkylphenyl, phenalkyl or halo in the ortho or meta position, and
n = 0–2 by contacting the aromatic compound with sulfuryl chloride in the liquid phase, the improvement comprising conducting the reaction in the presence of a metal salt-organic sulfur catalyst the metal salt component of the catalyst is selected from the group consisting of the metal halides or metal phenoxides of antimony, aluminum, iron, tin, titanium, zinc or mixtures thereof, in an amount greater than about 0.1 percent by weight of the aromatic compound, and the organic sulfur component of the catalyst is selected from the group consisting of thiophene, p-dithiane, diphenyl sulfide, thianthrene, dibenzyl sulfide, polyphenylene sulfide, diphenyl disulfide, thiophenol, dibenzothiophene, pentamethylene sulfide, carbon disulfide, or any of these sulfur compounds containing substituents selected from the group consisting of alkyl, alkoxy, halo, and mixtures thereof, said alkyl and alkoxy groups containing up to 10 carbon atoms, in an amount from about 0.02 to about 10 percent by weight of the aromatic compound.

2. The process of claim 1 wherein the metal component of the catalyst is selected from the group consisting of the metal halides or metal phenoxides of antimony, aluminum, iron, tin or mixtures thereof.

3. The process of claim 2 wherein the metal component is the metal halide or phenoxide of aluminum, iron or a mixture thereof.

4. The process of claim 1 wherein the metal component of the catalyst is the halide.

5. The process of claim 1 wherein the organic sulfur component of the catalyst is selected from the group consisting of thiophene, p-dithiane, diphenyl sulfide, thianthrene, dibenzyl sulfide, polyphenylene sulfide, diphenyl disulfide, thiophenol or a mixture thereof.

6. The process of claim 5 wherein the organic sulfur component is thiophene, p-dithiane, diphenyl sulfide, thianthrene or mixture thereof.

7. The process of claim 5 wherein the organic sulfur compound is diphenyl sulfide.

8. The process of claim 1 wherein the aromatic compound is phenol, diphenyl ether or an alkylphenol having an alkyl group of 1 to 6 carbon atoms.

9. The process of claim 1 wherein o-cresol is reacted to form 4-chloro-o-cresol.

10. The process of claim 1 wherein phenol is reacted to form p-chlorophenol or 2,4-dichlorophenol.

11. The process of claim 1 wherein the reaction is conducted at a temperature of from about 10° to about 100°C. and the amount of the organic sulfur component of the catalyst is from about 0.05 to about 2 percent by weight of the aromatic compound.

12. The process of claim 1 wherein the reaction is conducted at a temperature below about 100°C., wherein the metal component of the catalyst is the metal halide of aluminum, iron or a mixture thereof, wherein the organic sulfur component of the catalyst is diphenyl sulfide, and wherein the aromatic compound is phenol or o-cresol.

* * * * *